US009360339B2

(12) United States Patent
Roegelein

(10) Patent No.: US 9,360,339 B2
(45) Date of Patent: Jun. 7, 2016

(54) RENDERING MAPS WITH CANVAS ELEMENTS

(71) Applicant: Ulrich Roegelein, Gaiberg (DE)

(72) Inventor: Ulrich Roegelein, Gaiberg (DE)

(73) Assignee: SAP SE, Walldorf (DE)

( * ) Notice: Subject to any disclaimer, the term of this patent is extended or adjusted under 35 U.S.C. 154(b) by 243 days.

(21) Appl. No.: 13/740,646

(22) Filed: Jan. 14, 2013

(65) Prior Publication Data

US 2014/0201658 A1 Jul. 17, 2014

(51) Int. Cl.
*G01C 21/36* (2006.01)
*G09B 29/10* (2006.01)

(52) U.S. Cl.
CPC ............ *G01C 21/367* (2013.01); *G09B 29/106* (2013.01)

(58) Field of Classification Search
CPC .............. G09B 29/006; G06F 3/04845; G06F 3/04886; G06F 3/017; G06F 17/218; G06F 17/212; G06F 3/0481; G06F 9/4443; G06F 3/0488; G06F 3/04815; G06F 3/04817; H04L 41/22; G06T 11/001
USPC .......... 717/105, 109; 345/629, 592, 419, 619, 345/582; 709/217
See application file for complete search history.

(56) References Cited

U.S. PATENT DOCUMENTS 5,748,178 A 5/1998 Drewry
6,356,283 B1 3/2002 Guedalia
6,591,270 B1 * 7/2003 White ........................... 382/243
6,873,329 B2 3/2005 Cohen et al.
7,228,525 B2 6/2007 Chadzelek
7,610,549 B2 10/2009 Vignet
7,734,412 B2 6/2010 Shi et al.
8,117,255 B2 2/2012 Kolb et al.
8,185,818 B2 5/2012 Jahankhani
8,612,040 B2 12/2013 Thomas et al.
8,681,176 B1 3/2014 Maurer et al.
8,773,468 B1 * 7/2014 Ballagh .................... G09G 5/14 345/634
2002/0174124 A1 * 11/2002 Haas et al. .................... 707/100
2005/0195154 A1 * 9/2005 Robbins et al. ............... 345/156
2006/0050090 A1 * 3/2006 Ahmed et al. ................ 345/660
2008/0051989 A1 * 2/2008 Welsh ........................... 701/208
2008/0231643 A1 * 9/2008 Fletcher et al. ............... 345/661
2009/0089254 A1 * 4/2009 Von Kaenel et al. .............. 707/3
2009/0160873 A1 * 6/2009 Kew et al. ..................... 345/629
2009/0183083 A1 * 7/2009 Hedges ............... G06F 3/04817 715/738
2010/0100807 A1 * 4/2010 Matsumoto ......... G06F 17/2247 715/234
2011/0191407 A1 * 8/2011 Fu ............................ G06F 8/38 709/203
2012/0260326 A1 10/2012 Steigmann
2013/0076784 A1 3/2013 Maurer et al.
(Continued)

OTHER PUBLICATIONS

Author: Adam Ranfelt Title: Optimize HTML5 canvas rendering with layering Date: Oct. 30, 2012.*
(Continued)

*Primary Examiner* — Jeffrey A Gaffin
*Assistant Examiner* — Mandrita Brahmachari
(74) *Attorney, Agent, or Firm* — Fish & Richardson P.C.

(57) ABSTRACT

The disclosure generally describes computer-implemented methods, software, and systems for rendering maps using canvasses. One method includes: presenting a portion of a first map in a first canvas of a user interface; receiving a user input to perform a function associated with changing a display presentation of the first map; populating a second canvas with a second map associated with the first map; exposing at least a portion of the second canvas; and hiding at least a portion of the first canvas.

20 Claims, 5 Drawing Sheets

(56) References Cited

U.S. PATENT DOCUMENTS

| | | | | |
|---|---|---|---|---|
| 2013/0080504 | A1* | 3/2013 | Maurer et al. | 709/203 |
| 2014/0035948 | A1 | 2/2014 | Maurer et al. | |
| 2014/0059109 | A1 | 2/2014 | Jugel | |
| 2014/0098118 | A1 | 4/2014 | Liu et al. | |
| 2014/0201658 | A1 | 7/2014 | Roegelein | |

OTHER PUBLICATIONS

Canvas element, http://en.wikipedia.org/wiki/Canvas_element&oldid=529917426 (last visited Jan. 14, 2013.).

* cited by examiner

```
<!DOCTYPE HTML>
<html>
 ├─<head>
 └─<body online="Init()">
    ├─Text – Empty Text Node
    ├─<h1>
    ├─Text – Empty Text Node
    ├─<ul>
    ├─Text – Empty Text Node
    ├─<div id="vbi" style="left: 20px; width: 960px; height: 640px; position: absolute;">
    │  ├─Text – Empty Text Node
    │  ├─<!-- this is for tracing............... -->
    │  ├─Text – Empty Text Node
    │  ├─<!-- <div id="VBITrace" style="width:100%;height:200px"></div> -->
    │  ├─Text – Empty Text Node
    │  └─<div id="GeoSource" style="left: 0px; top: 0px; width: 100%; height: 200px overflow: hidden; position: relative;">
    │     ├─<img width="1" height="1" class="css-3d-layer" style="left: 501px; top: 286px; padding-top: 0px; padding-right: 0px ....
    │     ├─<img width="1" height="1" class="css-3d-layer" style="left: 501px; top: 542px; padding-top: 0px; padding-right: 0px ....
    │     ├─<img width="1" height="1" class="css-3d-layer" style="left: 245px; top: 286px; padding-top: 0px; padding-right: 0px ....
    │     ├─<img width="1" height="1" class="css-3d-layer" style="left: 757px; top: 286px; padding-top: 0px; padding-right: 0px ....
    │     ├─<img width="1" height="1" class="css-3d-layer" style="left: 796px; top: 286px; padding-top: 0px; padding-right: 0px ....
    │     ├─<img width="1" height="1" class="css-3d-layer" style="left: 30px; top: 542px; padding-top: 0px; padding-right: 0px ....
    │     ├─<img width="1" height="1" class="css-3d-layer" style="left: 245px; top: 286px; padding-top: 0px; padding-right: 0px ....
    │     ├─<img width="1" height="1" class="css-3d-layer" style="left: 757px; top: 286px; padding-top: 0px; padding-right: 0px ....
    │     ├─<img width="1" height="1" class="css-3d-layer" style="left: 501px; top: 286px; padding-top: 0px; padding-right: 0px ....
    │     ├─<img width="1" height="1" class="css-3d-layer" style="left: 501px; top: 542px; padding-top: 0px; padding-right: 0px ....
    │     ├─<img width="1" height="1" class="css-3d-layer" style="left: 245px; top: 286px; padding-top: 0px; padding-right: 0px ....
    │     ├─<img width="1" height="1" class="css-3d-layer" style="left: 757px; top: 286px; padding-top: 0px; padding-right: 0px ....
    │     └── ...
```

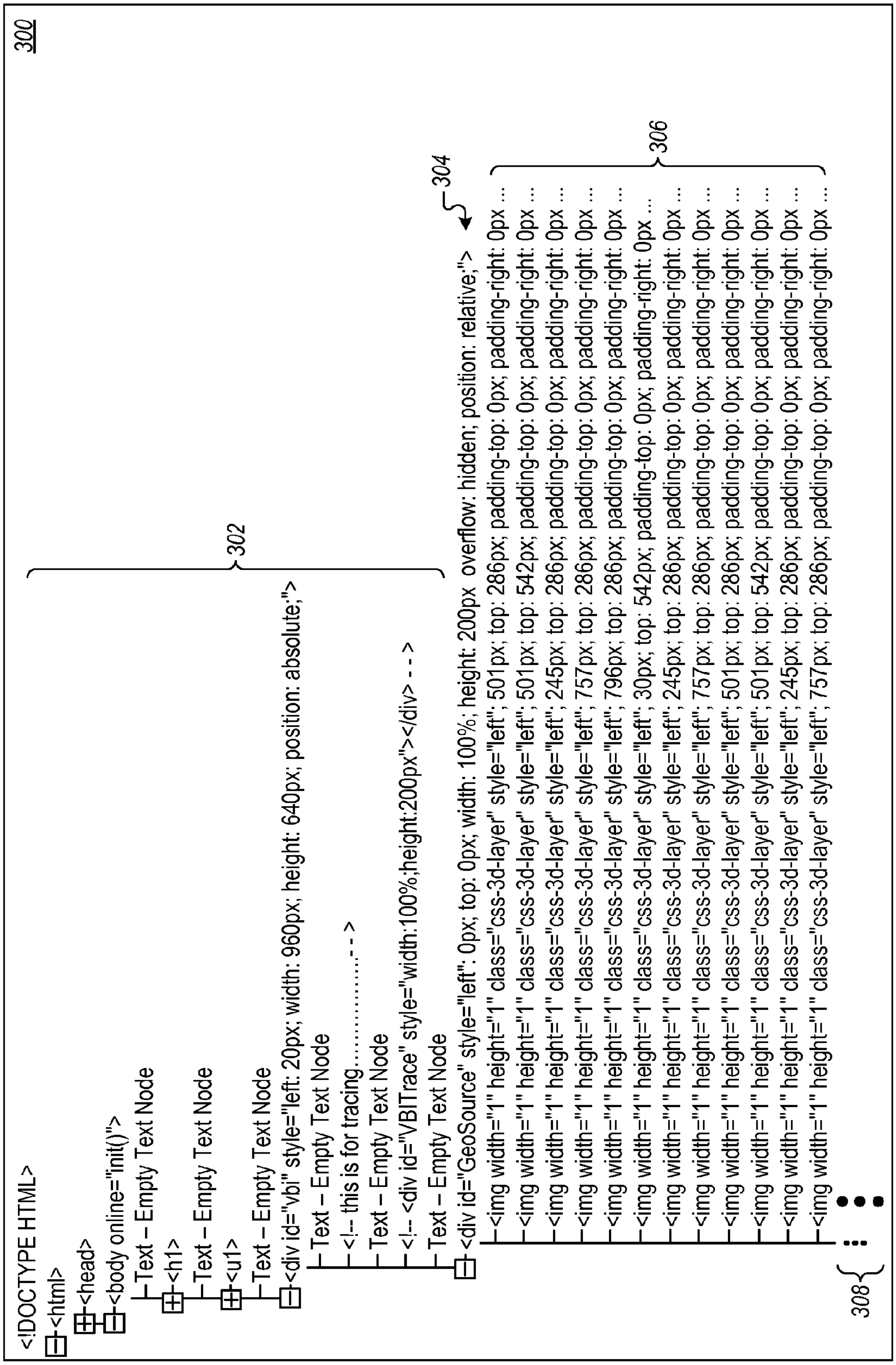

FIG. 3A

RENDERING MAPS WITH CANVAS ELEMENTS

TECHNICAL FIELD

The present disclosure relates to computer-implemented methods, software, and systems for displaying maps and handling operations affecting their presentation.

BACKGROUND

Maps can be presented to users on many types of computing devices. The maps can include map information available from various sources, including public cartographic and other sources. The maps that are presented can also include other elements, including text, markers or other elements that can be associated with business-related sources or used in other ways.

When a map is displayed, the user may decide to perform a map-related function. For example, the user may want to zoom in, zoom out, or move the presented map to another center-point. The user's computing device can perform these functions in different ways.

SUMMARY

The disclosure generally describes computer-implemented methods, software, and systems for rendering maps using canvas elements. As an example, using languages such as HTML5, maps can be rendered using canvases, including using canvas elements in a document object model (DOM) associated with the rendered map. This can require the use of fewer elements in the DOM and provide a simpler hierarchy of DOM elements than conventional techniques that use, for example, multiple individual DOM <img> and/or other individual image-related elements.

The present disclosure relates to computer-implemented methods, software, and systems for rendering maps using canvasses. One computer-implemented method includes: presenting a portion of a first map in a first canvas of a user interface; receiving a user input to perform a function associated with changing a display presentation of the first map; populating a second canvas with a second map associated with the first map; exposing at least a portion of the second canvas; and hiding at least a portion of the first canvas.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation can include all the following features:

In a first aspect combinable with any of the previous aspects, populating the second canvas includes rendering a portion of the first map into the second canvas.

In a second aspect combinable with any of the previous aspects, the function is a zoom-in function for zooming the presented first map, including: populating the second canvas with a zoomed-in view of the first map, stretching the first canvas for at least the time required to populate the second canvas, and replacing the first canvas with the second canvas to present a zoomed-in view of the first map.

In a third aspect combinable with any of the previous aspects, the function is a zoom-out function for zooming out of the presented first map, including populating the second canvas with a zoomed-out view of the first map, pinching the first canvas for at least the time required to populate the second canvas, and replacing the first canvas with the second canvas to present a zoomed-out view of the first map.

In a fourth aspect combinable with any of the previous aspects, function is a move function for moving a center-point of the first map, including identifying a location of the move, populating the second canvas with a portion of the map associated with the portion of the map not included in the first canvas, moving the first canvas in response to the identified location of the move, and replacing at least a portion of the first canvas with the second canvas to present a moved view of the first map.

In a fifth aspect combinable with any of the previous aspects, the canvasses are associated with HTML5.

In a sixth aspect combinable with any of the previous aspects, the user input is a mouse-click sequence, a menu selection, or a touch input.

In a seventh aspect combinable with any of the previous aspects, exposing the second canvas and hiding the first canvas includes exchanging the first and second canvasses and using a fade function.

In an eighth aspect combinable with any of the previous aspects, exposing the second canvas and hiding the first canvas includes positioning the second canvas in a layer above the first canvas and using a fade function to expose the second canvas.

In a nineth aspect combinable with any of the previous aspects, the method further includes rendering additional elements on a transparent layer independent from the first and second canvasses.

In a tenth aspect combinable with any of the previous aspects, the additional elements on the transparent layer are secure elements rendered by a data source separate from data sources for the first and second canvases.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 3A-3B show example document object models.

Like reference numbers and designations in the various drawings indicate like elements.

DETAILED DESCRIPTION

This disclosure generally describes computer-implemented methods, software, and systems for rendering maps using canvasses. For example, in languages such as HTML5, canvasses can be used to represent various layers associated with a displayed map. The layers can include layers having information that currently visible to the user and layers having information that is currently invisible to the user. In some implementations, the invisible layers can be used to render map information that is about to be displayed to the user, such as by fading a newly-rendered canvas over a currently-displayed one. The subject matter described in this specification can be implemented in particular implementations so as to realize one or more of the following advantages. First, techniques using canvasses can reduce the complexity, number of elements, and nesting level in the DOM. Second, the use of canvasses makes it possible to produce effects such as transformations, image compositing, gradient alphas, and smoothing.

Figure 1:
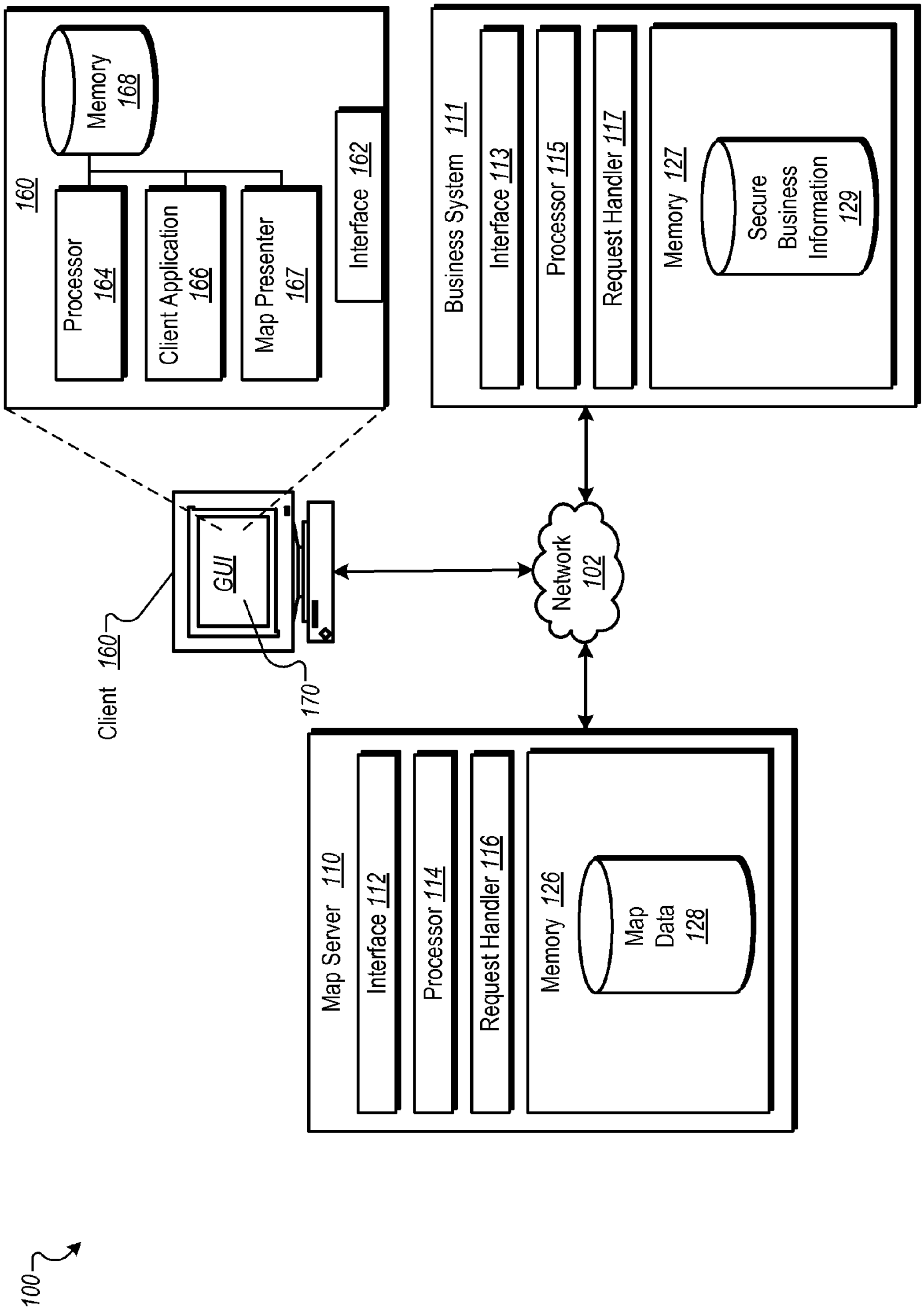
FIG. 1 is a block diagram illustrating an example environment for rendering maps using canvas elements.

FIG. 1 illustrates an example environment 100 for rendering maps using canvas elements. Specifically, the illustrated environment 100 includes at least one map server 110, at least one business system 111, and at least one client device 160, all of which are communicably coupled using a network 102. For example, a user interacting with a user interface presented on the client device 160 may view and manipulate maps that include map information from the map server 110 and secure business information from the business system 111. For example, the business system 111 can provide independent information, such as the secure business information, that can be displayed as a topmost layer on maps presented on the client device 160.

The map server 110 comprises an electronic computing device operable to provide map information, e.g., from map data 128. The map information may be provided to one or more client devices 160, e.g., for presentation of maps in map applications or for other purposes. At the same time, the client device 160 can annotate the presented maps using business-related information obtained from at least one business system 111. For example, the client device 160 can render a generic political map or other publicly available format associated with a geographic area. The rendered map can be overlaid with business information, e.g., markers that mark the locations of business entities, names of elements displayed on the map, and/or other business-related information that may be displayed on a map. The business-related information may be stored, for example, as a business object or other data object. In some implementations, the client device 160 can use canvases that are available in certain languages, e.g., HTML5, to render a map, including updating the map for certain map functions and/or operations triggered by the user (e.g., move, zoom, etc.). The use of canvases, for example, can alleviate performance issues that result from common ways of rendering map information. Other suitable structures instead of, or in addition to, canvasses can be used.

As used in the present disclosure, the term "computer" is intended to encompass any suitable processing device. For example, although FIG. 1 illustrates a single map server 110 and a single business system 111, the environment 100 can be implemented using two or more map servers 110 and/or business systems 111. The environment 100 can also be implemented using computers other than servers, including a server pool. Indeed, components of the environment 100 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated components of the environment 100 may be adapted to execute any operating system, including Linux, UNIX, Windows, Mac OS®, Java™, Android™, iOS or any other suitable operating system. According to some implementations, components of the environment 100 may also include, or be communicably coupled with, an e-mail server, a Web server, a caching server, a streaming data server, and/or other suitable server(s). In some implementations, components of the environment 100 may be distributed in different locations and coupled using the network 102.

The map server 110 includes an interface 112, a processor 114, a request handler 116, and a memory 126. The interface 112 is used by the map server 110 for communicating with other systems in a distributed environment, connected to the network 102 (e.g., the client device 160), as well as other systems (not illustrated) communicably coupled to the network 102. Generally, the interface 112 comprises logic encoded in software and/or hardware in a suitable combination and operable to communicate with the network 102. More specifically, the interface 112 may comprise software supporting one or more communication protocols associated with communications such that the network 102 or interface's hardware is operable to communicate physical signals within and outside of the illustrated environment 100.

The request handler 116 can, for example, handle requests for map information received from systems and/or devices external to the map server 110. For example the request handler 116 can handle a request received from the client device 160 for a map and/or other map information for particular geographic area (e.g., an area including the continental United States). The request can include specific coordinates and/or other parameters by which the corresponding information is to be retrieved from the map data 128. In response to the request, the request handler 116 can provide information associated with portions of the requested map. For example, the map information provided in response to the request can include information corresponding to portions of a map (e.g., tiles, cells, B-trees and/or other structures) that encompass the identified area.

The map server 110 also includes the memory 126, or multiple memories 126. The memory 126 may include any type of memory or database module and may take the form of volatile and/or non-volatile memory including, without limitation, magnetic media, optical media, random access memory (RAM), read-only memory (ROM), removable media, or any other suitable local or remote memory component. The memory 126 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the map server 110. Additionally, the memory 126 may include any other appropriate data, such as VPN applications, firmware logs and policies, firewall policies, a security or access log, print or other reporting files, as well as others. In some implementations, memory 126 includes the map data 128 (described above). Other components within the memory 126 are possible.

The business system 111 includes an interface 113, a processor 115, a request handler 117, and a memory 127. The interface 113 is used by the business system 111 for communicating with other systems in a distributed environment, connected to the network 102 (e.g., the client device 160), as well as other systems (not illustrated) communicably coupled to the network 102. Generally, the interface 113 comprises logic encoded in software and/or hardware in a suitable combination and operable to communicate with the network 102. More specifically, the interface 113 may comprise software supporting one or more communication protocols associated with communications such that the network 102 or interface's hardware is operable to communicate physical signals within and outside of the illustrated environment 100.

The request handler 117 can, for example, handle requests for secure business information received from systems and/or devices external to the business system 111. For example the request handler 117 can handle a request received from the client device 160 for business-related information that may be rendered on top of map information obtained from the map server 110. In response to the request, the request handler 117 can provide the corresponding business-related information, e.g., information associated with business-related entities that are included within the boundaries of a requested map. For any given map displayed on the client device 160, there may be business-related information obtained from multiple business systems 111. In some instances, the request handler 117 may be a part of or associated with one or more business applications and their associated data.

The business system 111 also includes the memory 127, or multiple memories 127. The memory 127 may include any type of memory or database module and may take the form of volatile and/or non-volatile memory including, without limitation, magnetic media, optical media, random access memory (RAM), read-only memory (ROM), removable media, or any other suitable local or remote memory component. The memory 127 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the business system 111. Additionally, the memory 127 may include any other appropriate data, such as VPN applications, firmware logs and policies, firewall policies, a security or access log, print or other reporting files, as well as others. In some implementations, memory 127 includes the secure business information 129. Other components within the memory 127 are possible.

The illustrated environment of FIG. 1 also includes the client device 160, or multiple client devices 160. The client device 160 may be any computing device operable to connect to, or communicate with, at least the map server 110 and the business system 111 over the network 102 using a wire-line or wireless connection. In general, the client device 160 comprises an electronic computer device operable to receive, transmit, process, and store any appropriate data associated with the environment 100 of FIG. 1.

The illustrated client device 160 further includes a client application 166. The client application 166 is any type of application that allows the client device 160 to request and view content on the client device 160. In some implementations, the client application 166 can be and/or include map applications, a Web browser, or any other applications that may display a map. In some implementations, the client application 166 can use parameters, metadata, and other information received at launch to access a particular set of data received from the map server 110. Once a particular client application 166 is launched, a user may view and interact with maps presented on the client device 160. Client applications 166 can also include applications by which the user of the client device 160 can interact with the business system 111, including during the display of maps that include information obtained from the business system 111.

The illustrated client device 160 further includes a map presenter 167 for rendering maps. For example, the map presenter 167 can be included in or accessed by the client application 166. As will be described in further detail below, the map presenter 167 can use multiple canvasses and/or layers for presenting maps and performing functions on the maps.

The illustrated client device 160 further includes an interface 162, a processor 164, and a memory 168. The interface 162 is used by the client device 160 for communicating with other systems in a distributed environment—including within the environment 100—connected to the network 102, e.g., the map server 110, the business system 111, as well as other systems communicably coupled to the network 102 (not illustrated). Generally, the interface 162 comprises logic encoded in software and/or hardware in a suitable combination and operable to communicate with the network 102. More specifically, the interface 162 may comprise software supporting one or more communication protocols associated with communications such that the network 102 or interface's hardware is operable to communicate physical signals within and outside of the illustrated environment 100.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including JavaScript™, Hyper-Text Mark-up Language (HTML), HTML5, C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

As illustrated in FIG. 1, the client device 160 includes the processor 164. Although illustrated as the single processor 164 in FIG. 1, two or more processors 164 may be used according to particular needs, desires, or particular implementations of the environment 100. Each processor 164 may be a central processing unit (CPU), an application specific integrated circuit (ASIC), a field-programmable gate array (FPGA), or another suitable component. Generally, the processor 164 executes instructions and manipulates data to perform the operations of the client device 160. Specifically, the processor 164 executes the functionality required to send requests to, and process responses from, the map server 110 and the business system 111.

The illustrated client device 160 also includes a memory 168, or multiple memories 168. The memory 168 may include any memory or database module and may take the form of volatile or non-volatile memory including, without limitation, magnetic media, optical media, random access memory (RAM), read-only memory (ROM), removable media, or any other suitable local or remote memory component. The memory 168 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 160. Additionally, the memory 168 may include any other appropriate data, such as VPN applications, firmware logs and policies, firewall policies, a security or access log, print or other reporting files, as well as others.

The illustrated client device 160 is intended to encompass any computing device such as a smart phone, tablet computing device, PDA, desktop computer, laptop/notebook computer, wireless data port, one or more processors within these devices, or any other suitable processing device. For example, the client device 160 may comprise a computer that includes an input device, such as a keypad, touch screen, or other device that can accept user information, and an output device that conveys information associated with the client device 160, including digital data, visual information, or a graphical user interface (GUI) 170, as shown with respect to and included by the client device 160. The GUI 170 interfaces with at least a portion of the environment 100 for any suitable purpose, including generating a visual representation of a Web browser, and displaying maps in map applications.

Figure 2:
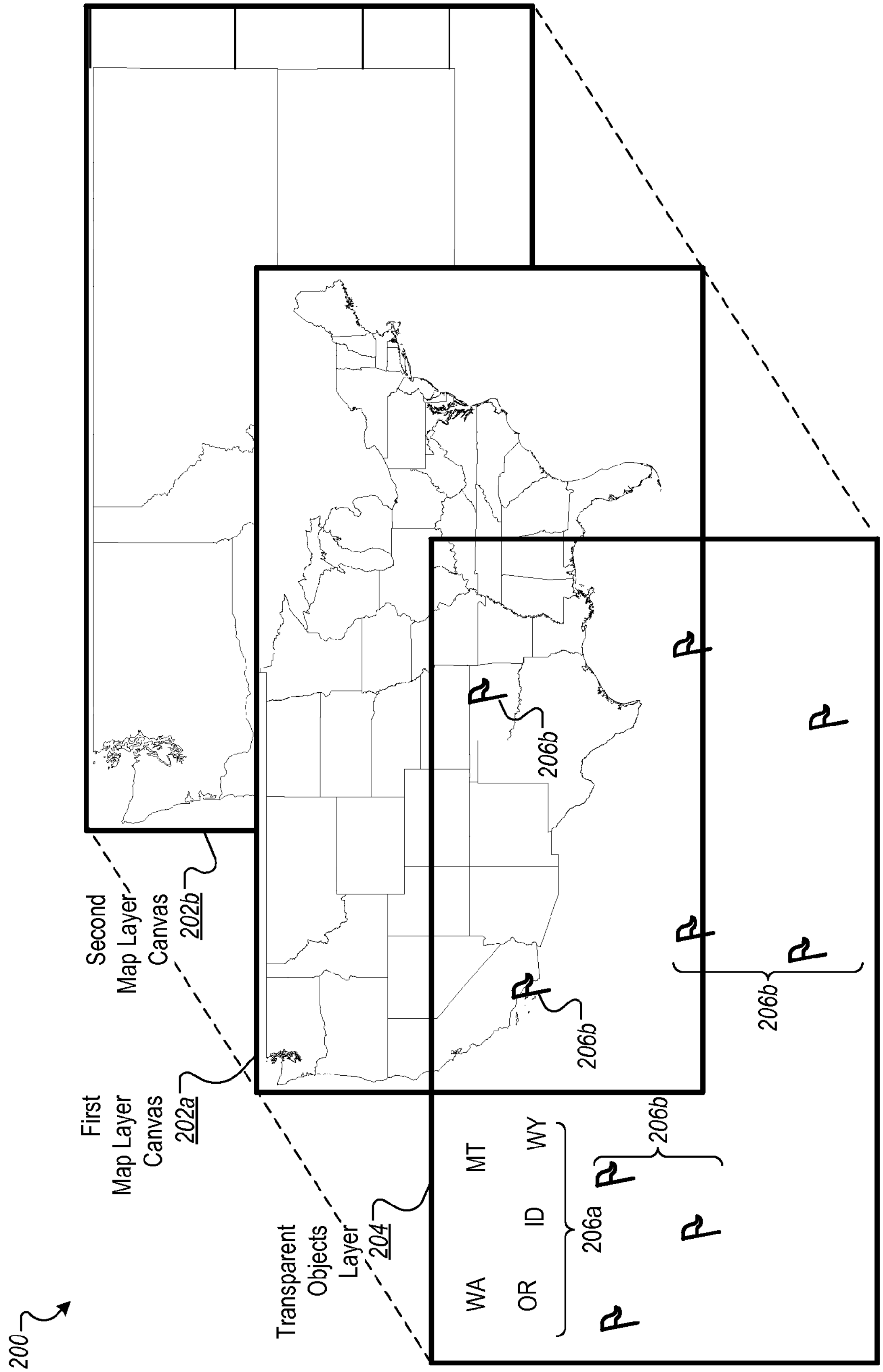
FIG. 2 shows example canvas elements used in rendering maps.

FIG. 2 shows example canvas elements 200 used in rendering maps. For example, the canvas elements 200 can be used in presenting maps that are displayed on the client device 160, such as in map applications. Canvas elements 200 can include a first map layer canvas 202*a* and a second map layer canvas 202*b*, each of which can contain map information obtained from the map server 110 and/or other sources. Transparent objects layer 204 can include elements that are associated with business-related information obtained from the business system 111 and/or other business systems. Example elements include labels 206*a* and location markers 206*b*, but many other elements are possible. FIG. 2 shows the canvas elements 200 (e.g., elements 202*a*, 202*b* and 204) as being offset to point out zoomed features and transparency, but the layers share the same rectangular footprint.

The canvas elements 200 can be used, for example, within HTML5 or other suitable language in order to render maps using a technique in which the data object model (DOM) associated with the rendered map includes the canvas elements 200. For example, a map that a user sees can be rendered using map information in the first map layer canvas 202*a*, and additional objects, such as business-related objects, can be rendered in the transparent objects layer 204. The two different layers can be used, for example, in situations in which map information is obtained from one or more sources that cannot be combined or rendered on the same layer as business-related information due to protocol, security or other reasons. The canvas elements 200 can be used instead of, for example, a hierarchy of numerous individual image portion-related DOM elements (e.g., as will be apparent in the description of FIGS. 3A and 3B).

In some implementations, in order to perform map functions, such as zoom-in, zoom-out, move or other map display-changing functions, the second map layer canvas 202*b* can be used. For example, images can be rendered to the second map layer canvas 202*b* while the first map layer canvas 202*a*, or a portion thereof, is being displayed. Rendering to the second map layer canvas 202*b* can occur, for example, in response to a user's interaction with a map, such as a zoom-in function. In the zoom-in function, for example, a map of northwest US states can be drawn in the second map layer canvas 202*b* while the entire continental US states are still being displayed in the first map layer canvas 202*a*. For example, the first map layer canvas 202*a* can be stretched to provide a temporarily zoomed-in view of the first map layer canvas 202*a* while the second map layer canvas 202*b* is being rendered. When rendering of the zoomed-in map is complete, the second map layer canvas 202*b* can be faded over the stretched first map layer canvas 202*a*. At that time, what constitutes the top and second layer can be switched.

Figure 3B:
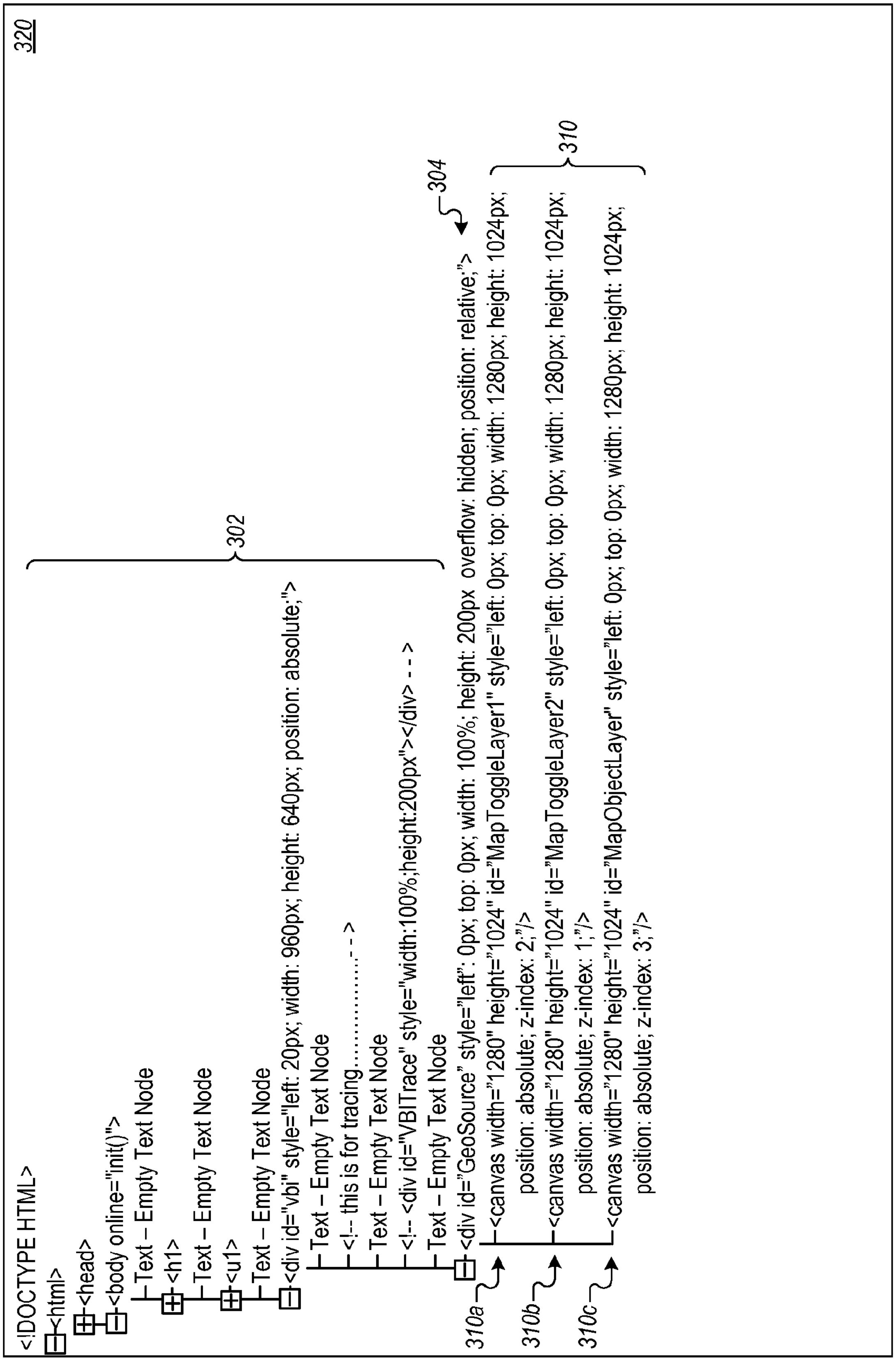

FIGS. 3A-3B show example DOMs 300 and 320, respectively. For example, the DOMs 300 and 320 point out differences that can exist in implementations in which canvasses are either used or not used. Each of the DOMs 300 and 320 include the same header entries 302 and div entry 304. However, the DOM 300 is an example of a DOM in which canvasses are not used. As such, the DOM 300 includes numerous image entries 306 (e.g., "<img . . . " entries) that are used in techniques in which individual images (e.g., corresponding to portions of a map) are updated in order to accomplish a map function such as a zoom-in, zoom-out or move. There can be hundreds or more image entries 306, the potential existence of such entries being indicated by ellipses 308. Further, each of the image entries 306 may need to be individually updated during a map update function such as a move or zoom.

Referring now to FIG. 3B, the DOM 320 includes three layer entries 310. A first canvas entry 310*a*, for example, can correspond to the first map layer canvas 202*a* described with reference to FIG. 2. A second canvas entry 310*b*, for example, can correspond to the second map layer canvas 202*b*. A third canvas entry 310*c*, for example, can correspond to the transparent objects layer 204. In some implementations, additional map layer canvasses can be used, e.g., in more complex map functions or for other reasons. For example, there can be additional map canvas layers and additional transparent objects layers.

In some implementations, the first canvas entry 310*a* and the second canvas entry 310*b* can be associated with HTML5. Other implementations are possible that use other suitable types of structures used in other languages, e.g., in which a hierarchy of numerous individual image portion-related DOM elements are replaced by a few layer-related structures.

Figure 4:
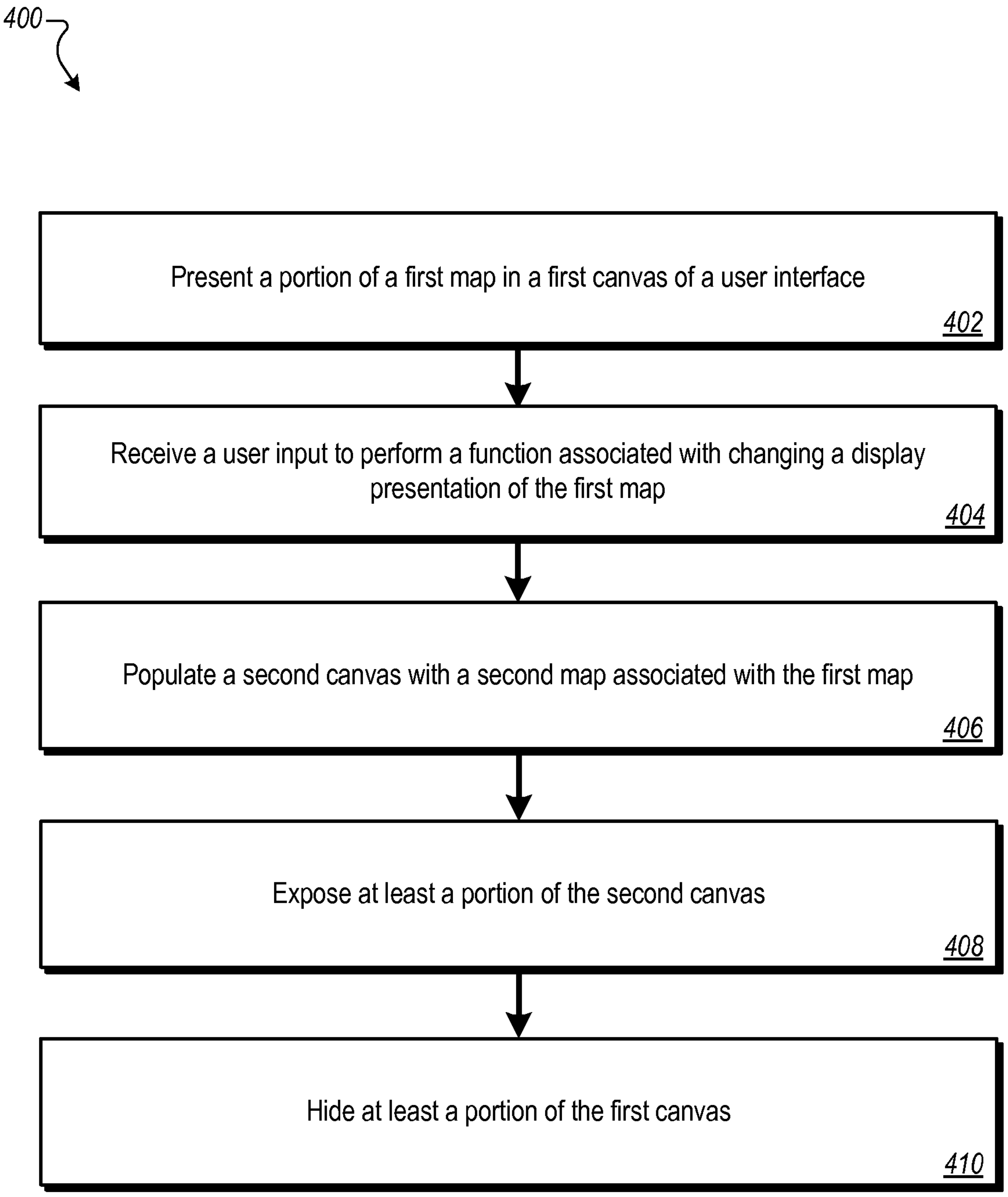
FIG. 4 is a flowchart of an example method for rendering maps using canvas elements.

FIG. 4 is a flowchart of an example method 400 for rendering maps. For clarity of presentation, the description that follows generally describes method 400 in the context of FIGS. 1 through 3B. However, it will be understood that the method 400 may be performed, for example, by any other suitable system, environment, software, and hardware, or a combination of systems, environments, software, and hardware as appropriate. For example, the client device 160 and/or its components can be used to execute the method 400, e.g., using information accessed from the map server 110 and the business system 111.

At 402, a portion of a first map is presented in a first canvas of a user interface. As an example, the map presenter 167 can present the first map layer canvas 202*a* in the GUI 170 on the client device 160. The first map layer canvas 202*a* may contain, for example, a map of the continental United States.

In some implementations, additional elements can be rendered on a transparent layer independent from the first and second canvasses. For example, the map presenter 167 can present the labels 206*a* and the location markers 206*b* using the transparent objects layer 204. In some implementations, the additional elements on the transparent layer can be secure elements rendered using data from a data source separate from data sources for the first and second canvases. For example, the labels 206*a* and the location markers 206*b* can be rendered using information available from business systems 111. Other layers and/or other sources for information can also be presented.

At 404, a user input is received to perform a function associated with changing a display presentation of the first map. For example, while viewing the map of the continental United States, the user may want to zoom in to a higher-resoluton map of the northwestern states. The user input that requests to zoom in on the map, for example, may be a mouse-click sequence, a menu selection, a touch input, or some other user input to initiate a zoom function.

At 406, in response to the received user input, a second canvas is populated with a second map associated with the first map. For example, the map presenter 167 can render the portions of the continental United States into the second map layer canvas 202*b*, e.g., including map lines for at least Washington, Idaho, Montana and other states in that region. Rendering into the second map layer canvas 202*b* can occur while the user is viewing the first map layer canvas 202*a* in addition to any information that is included in the transparent objects layer 204, such as business-related information.

At 408, at least a portion of the second canvas is exposed. For example, the map presenter 167 can present the second map layer canvas 202*b* over the first map layer canvas 202*a*. This can occur, for example, using an operation performed by the map presenter 167 that moves the second canvas entry 310*b* over the first canvas entry 310*a*.

At 410, at least a portion of the first canvas is hidden. For example, this operation can occur at essentially the same time as 408, e.g., by the map presenter 167 or some other component of the client device 160 that switches the order of the second canvas entry 310*b* and the first canvas entry 310*a* in the DOM 320.

In some implementations, exposing the second canvas and hiding the first canvas includes exchanging the first and second canvasses and using a fade function. For example, the map presenter 167 can switch the first canvas entry 310*a* and the second canvas entry 310*b*, and fade one over the other.

In some implementations, exposing the second canvas and hiding the first canvas includes positioning the second canvas in a layer above the first canvas and using a fade function to expose the second canvas. For example, the map presenter 167 can move the first canvas entry 310*a* before the second canvas entry 310*b*, and fade one over the other.

In some implementations, the function in 404 can be a zoom-in function. The zoom-in function can be accomplished, for example, by populating the second canvas with a zoomed-in view of the first map, stretching the first canvas for at least the time required to populate the second canvas, and replacing the first canvas with the second canvas to present a zoomed-in view of the first map. For example, while the second map layer canvas 202*b* is being populated with a map of at least Washington, Idaho, Montana and other states, the map presenter 167 can stretch the display of the first map. While doing so can contain a stretched version of the map for at least Washington, Idaho, Montana and other states, the appearance can appear slightly fuzzy for a very brief time, e.g., until the second map is presented and replaces the first map, the second map having a finer resoltion of those state lines and elements. The replacement of the first canvas with the second canvas can be achieved by switching the order function of the first canvas entry 310*a* and the second canvas entry 310*b* in the DOM 320.

In some implementations, the function in 404 can be a zoom-out function. The zoom-out function for zooming out of the presented first map can be similar to the zoom-in function, except that the first canvas is pinched, not stretched. For example, the zoom-out function can be accomplished by populating the second canvas with a zoomed-out view of the first map, pinching the first canvas for at least the time required to populate the second canvas, and replacing the first canvas with the second canvas to present a zoomed-out view of the first map. The zoom-out function can also be performed by the map presenter 167.

In some implementations, the function in 404 can be a move function. The move function can be accomplished, for example, by identifying a location of the move, populating the second canvas with a portion of the map associated with the portion of the map not included in the first canvas, moving the first canvas in response to the identified location of the move, and replacing at least a portion of the first canvas with the second canvas to present a moved view of the first map. The map presenter 167 can populate the second canvas in the same way as the zoom-in and zoom-out functions, including adding map information not already included on the map. The first canvas can be moved horizontally, vertically, or in a combination of both, with the second canvas being used to initially populate the portions of the map presentation left blank or empty when the first canvas is moved. In some instances, the second canvas may be populated with the entire map as it is to be presented after the move, including the remaining viewable portions of the first canvas. When the second canvas is fully populated, the second canvas and the first canvas can be switched.

The preceding figures and accompanying description illustrate example processes and computer implementable techniques. But example environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, in parallel, and/or in combination. In addition, many of the operations in these processes may take place simultaneously, concurrently, in parallel, and/or in different orders than as shown. Moreover, example environment 100 may use processes with additional, fewer and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method comprising:
- presenting a portion of a first map in a first canvas of a user interface, wherein the first canvas is associated with a first canvas entry in a document object model; and
- in response to a user input to perform a function associated with changing a display presentation of the first map:
  - populating a second canvas with a second map associated with the first map, wherein the second canvas is associated with a second canvas entry in the document object model, wherein the second canvas entry is ordered after the first canvas entry in the document object model;
  - exposing at least a portion of the second canvas; and
  - hiding at least a portion of the first canvas; and
- wherein the function is a zoom-in function for zooming the presented first map, the method comprising:
  - populating the second canvas with a zoomed-in view of the first map;
  - stretching the first canvas presented in the user interface to provide a temporarily zoomed-in view of the first map for at least the time required to populate the second canvas;
  - switching order of the first canvas entry and the second canvas entry in the document object model in response to the second canvas being populated, where the switched order in the document object model comprises the second canvas entry being ordered before the first canvas entry in the document object model; and in response to switching the order of the canvases in the document object model, replacing the first canvas with the second canvas to present the zoomed-in view of the first map in the user interface.

2. The method of claim 1, wherein populating the second canvas includes rendering a portion of the first map into the second canvas.

3. The method of claim 1, wherein the function is a move function for moving a center-point of the first map, including:

identifying a location of the move;

populating the second canvas with a portion of the map associated with the portion of the map not included in the first canvas;

moving the first canvas in response to the identified location of the move; and replacing at least a portion of the first canvas with the second canvas to present a moved view of the first map.

4. The method of claim 1, wherein the canvasses are associated with HTML5.

5. The method of claim 1, wherein the user input is a mouse-click sequence, a menu selection, or a touch input.

6. The method of claim 1, wherein exposing the second canvas and hiding the first canvas includes exchanging the first and second canvasses and using a fade function.

7. The method of claim 1, wherein exposing the second canvas and hiding the first canvas includes positioning the second canvas in a layer above the first canvas and using a fade function to expose the second canvas.

8. The method of claim 1, further comprising rendering additional elements on a transparent layer independent from the first and second canvasses; and wherein the first and second canvases have a same data source and the additional elements on the transparent layer are rendered using data from a data source separate from the data source for the first and second canvases.

9. A computer-program product, the computer program product comprising computer-readable instructions embodied on tangible, non-transitory media, the instructions operable when executed by at least one computer to:

present a portion of a first map in a first canvas of a user interface, wherein the first canvas is associated with a first canvas entry in a document object model; and in response to a user input to perform a function associated with changing a display presentation of the first map:

populate a second canvas with a second map associated with the first map, wherein the second canvas is associated with a second canvas entry in the document object model, wherein the second canvas entry is ordered after the first canvas entry in the document object model;

expose at least a portion of the second canvas; and hide at least a portion of the first canvas; and wherein the function is a zoom-out function for zooming out of the presented first map, the instructions operable when executed by the at least one computer to:

populate the second canvas with a zoomed-out view of the first map;

pinch the first canvas presented in the user interface to provide a temporarily zoomed-out view of the first map for at least the time required to populate the second canvas;

switch order of the first canvas entry and the second canvas entry in the document object model in response to the second canvas being populated, where the switched order in the document object model comprises the second canvas entry being ordered before the first canvas entry in the document object model; and in response to switching the order of the canvases in the document object model, replace the first canvas with the second canvas to present the zoomed-out view of the first map in the user interface.

10. The computer-program product of claim 9, wherein populating the second canvas includes rendering a portion of the first map into the second canvas.

11. The computer-program product of claim 9, wherein the function is a move function for moving a center-point of the first map, the instructions operable when executed by the at least one computer to:

identify a location of the move;

populate the second canvas with a portion of the map associated with the portion of the map not included in the first canvas;

move the first canvas in response to the identified location of the move; and replace at least a portion of the first canvas with the second canvas to present a moved view of the first map.

12. The computer-program product of claim 9, wherein the canvasses are associated with HTML5.

13. The computer-program product of claim 9, wherein the user input is a mouse-click sequence, a menu selection, or a touch input.

14. The computer-program product of claim 9, wherein exposing the second canvas and hiding the first canvas includes exchanging the first and second canvasses and using a fade function.

15. A system, comprising:

memory operable to store map and business-related information; and at least one hardware processor interoperably coupled to the memory and operable to perform instructions to:

present a portion of a first map in a first canvas of a user interface, wherein the first canvas is associated with a first canvas entry in a document object model;

in response to a user input to perform a function associated with changing a display presentation of the first map:

populate a second canvas with a second map associated with the first map, wherein the second canvas is associated with a second canvas entry in the document object model, wherein the second canvas entry is ordered after the first canvas entry in the document object model;

expose at least a portion of the second canvas;

switch order of the first canvas entry and the second canvas entry in the document object model in response to the second canvas being populated, where the switched order in the document object model comprises the second canvas entry being ordered before the first canvas entry in the document object model; and in response to switching the order of the canvases in the document object model, hide at least a portion of the first canvas; and render additional elements on a transparent layer independent from the first and second canvasses; and wherein the first and second canvases have a same data source and the additional elements on the transparent layer are rendered using data from a data source separate from the data source for the first and second canvases.

16. The system of claim 15, wherein the function is a zoom-in function for zooming the presented first map, the processor operable to:

populate the second canvas with a zoomed-in view of the first map;

stretch the first canvas presented in the user interface to provide a temporarily zoomed-in view of the first map for at least the time required to populate the second canvas; and replace the first canvas with the second canvas to present a zoomed-in view of the first map.

17. The system of claim 15, wherein the function is a zoom-out function for zooming the presented first map, the processor operable to:

populate the second canvas with a zoomed-out view of the first map;

pinch the first canvas presented in the user interface to provide a temporarily zoomed-out view of the first map for at least the time required to populate the second canvas; and replace the first canvas with the second canvas to present a zoomed-out view of the first map.

18. The system of claim 15, wherein the canvasses are associated with HTML5.

19. The system of claim 15, wherein exposing the second canvas and hiding the first canvas includes exchanging the first and second canvasses and using a fade function.

20. The system of claim 15, wherein exposing the second canvas and hiding the first canvas includes positioning the second canvas in a layer above the first canvas and using a fade function to expose the second canvas.

* * * * *